United States Patent
Maro et al.

[11] Patent Number: 6,027,801
[45] Date of Patent: Feb. 22, 2000

[54] MAGNETIC RECORDING MEDIUM

[75] Inventors: Tsuyoshi Maro, Kyoto-fu; Kazuyoshi Adachi, Suita; Naoki Kitagaki, Kyoto-fu; Osamu Ishizaki, Suita; Hideo Daimon, Ibaraki-ken, all of Japan

[73] Assignee: Hitachi Maxell, Ltd., Ibaraki, Japan

[21] Appl. No.: 09/054,491

[22] Filed: Apr. 3, 1998

[30] Foreign Application Priority Data

Apr. 4, 1997 [JP] Japan .................................. 9-102456

[51] Int. Cl.$^7$ ........................................... G11B 5/66
[52] U.S. Cl. ................... 428/332; 428/336; 428/694 T; 428/694 TS; 428/694 TP; 428/900
[58] Field of Search .................. 428/694 T, 694 TS, 428/694 TP, 336, 332, 900

[56] References Cited

U.S. PATENT DOCUMENTS

| | | | |
|---|---|---|---|
| 5,693,426 | 12/1997 | Lee | 428/611 |
| 5,766,727 | 6/1998 | Moroishi et al. | 428/141 |
| 5,800,931 | 9/1998 | Lee | 428/611 |
| 5,824,427 | 10/1998 | Kobayashi | 428/694 TS |

Primary Examiner—Leszek Kiliman
Attorney, Agent, or Firm—Birch, Stewart, Kolasch & Birch, LLP

[57] ABSTRACT

The present invention provides a magnetic recording medium with distinguished SNR and mechanical characteristics, which comprises an underlayer, a ferromagnetic thin film metallic layer and a protective film layer successively and continuously laminated on a non-magnetic resin substrate, where (A) at least one layer selected from the group consisting of an Si layer, an $Si_wN_xC_yO_z$ layer and an $Al_wN_xC_yO_z$ layer and (B) at least one layer selected from the group consisting of silicides, nitrides, oxides or their mixtures of Ti, Ta, Mo, V, Zr and their alloys are laminated on the non-magnetic resin substrate in the order of (A) and (B) or (i) a layer composed of at least one material selected from the group consisting of Ti, Ta, Mo, V, Zr, Nb and their alloys, (ii) at least one layer selected from the group consisting of an Si layer, an $Si_wN_xC_yO_z$ layer and an $Al_wN_xC_yO_z$ layer (where w+x+y+z=100 at. %, w≧30 at. %, 0 ≦z≦50 at. % and x+y≧20 at. %), and (iii) a layer composed of at least one material selected from the group consisting of Ti, Ta, Mo, V, Zr and their alloys are laminated on the non-magnetic resin substrate in the order of (i), (ii) and (iii), between the non-magnetic resin substrate and the underlayer.

21 Claims, 2 Drawing Sheets

MAGNETIC RECORDING MEDIUM

BACKGROUND OF THE INVENTION

The present invention relates to a magnetic recording medium. More particularly, the present invention relates to a magnetic recording medium with improved mechanical characteristics and reduced noise.

In accordance with the recent trend of smaller device sizes and increased amounts of information, much smaller sizes and higher recording density are required for magnetic memory devices together with increased cost reduction. To meet the requirements, disks using resins as substrate materials are now under development.

To increase the recording density without any increase in device sizes, it is necessary to increase area recording density. To that effect, it is necessary to make the recording wavelength smaller (i.e. to increase a linear recording density) and make the recording track width smaller (i.e. to increase a track density), in other words, to make a recorded pattern smaller.

In that case, reduction in signal/noise ratio (SNR) is a problem. As the recording wavelength becomes smaller to approach the size of the gap length of a magnetic head, the signal output is decreased due to the gap loss. As the track width becomes smaller, the signal output is inevitably decreased in direct proportion to the decreasing track width. Decrease in the signal output in the shortest recording wavelength region can be prevented by making the gap length smaller and also by making the spacing between the recording medium and the magnetic head smaller, but in that case it is necessary to lower the simultaneously increasing noise level of the recording medium, thereby increasing the SNR. To make the spacing between the recording medium and the magnetic head smaller, it is also necessary to make the surface of the recording medium as flat as possible.

In case of using a CoCr alloy thin film as a recording magnetic layer, the medium noise has been lowered by a process procedure of forming a CoCr alloy thin film on a substrate by vacuum film forming such as vacuum vapor deposition, etc. while heating the substrate to 250° C. or higher, depositing non-magnetic materials composed mainly of Cr between grains of Co alloy magnetic particles, thereby magnetically isolating the Co alloy magnetic particles and making the particle sizes of the magnetic particles smaller. However, the process procedure cannot be applied to magnetic disks using ordinary resins having a softening temperature of 100°–250° C. as substrates.

Another reported process for lowering the noise level without substrate heating, comprises dispersing non-magnetic materials such as SiOx, etc. in the Co alloy thin film recording layer, thereby isolating the magnetic particles, has been reported, but the process requires an RF magnetron sputtering procedure, because non-electroconductive oxides, nitrides, etc. must be sputtered. Generally, the RF magnetron sputtering procedure is liable to make a broader plasma extension than DC magnetron sputtering procedure, and thus the substrate temperature is liable to elevate. In the case of magnetic disks, film formation must be carried out on both sides of a disk and thus the disk must be supported at the outermost periphery of the disk, resulting in such problems as poor heat runaway during the sputtering and substrate deformation by heat, when the magnetic disk is based on a substrate using resin having a low softening temperature.

Furthermore, there are still the following problems besides the above-mentioned problem [i.e. (1) to lower the noise level]. (2) Since the resin has a water absorption of at least about 1% in contrast to Al and glass with substantially zero water absorption, corrosion of the recording film due to the moisture contained in the substrate is more liable to occur than in case of Al or glass substrate. (3) Since the resin is considerably soft, as compared with Al and glass, the resin substrate is liable to be damaged or scored, when a magnetic head slides on the resin substrate medium or collides with the resin substrate. (4) Since there is a large difference in the coefficient of thermal expansion between the resin and Cr or Co alloy constituting the recording film, cracks are liable to occur on the resin substrate, when a metallic thin film of Cr or Co alloy is formed thereon.

To solve the above-mentioned problems (2), (3) and (4), the following processes have been proposed: processes for forming a metallic film of Al, Ti, Cu, Zn, Ag, In or the like as a buffer layer between the resin substrate and the recording film (JP-A 4-143920 and JP-A 5-159266); processes for providing a ceramic film such as an aluminum oxide film (JP-A 64-42022), an SiN film (JP-A 64-42023), a SiC film (JP-A 64-42024), an alternately laminated film of soft SiC and soft SiC (JP-A 2-96918), a laminated film of SiN having a compression stress and SiN having a tensile stress (JP-A 2-96919), an alternately laminated film of soft BN and hard BN (JP-A 2-96920), an alternately laminated film of non-magnetic metallic layers and ceramic layers (JP-A 2-96921), a B film (JP-A 2-62713), etc.; and a process for forming a single layer or a plurality of layers of Ti, Ti alloy, or Ti compound (oxide, nitride and sulfide) on an aluminum oxide or silicon oxide-formed resin substrate or directly on a resin substrate (JP-A 61-167117).

In case of using a metallic film as a buffer layer, since there is no conformity in the crystal structure and lattice constant among the metallic buffer layer, the underlayer for the magnetic recording layer and the magnetic layer, crystal growth of magnetic layer is inhibited, resulting in deterioration of magnetic properties, and any improvement of electromagnetic conversion characteristics cannot be expected. Furthermore, since the metal is softer than the ceramic, there is the problem that the recording film is liable to be damaged at CSS (Contact-Start-Stop).

In case of using a ceramic buffer layer (JP-A 64-42022, 42023, 42024, etc.) on the other hand, the above-mentioned problem that the recording film is liable to be damaged relative to the metallic film buffer layer can be overcome, because the ceramic has a considerably higher hardness than that of the metal. However, the ceramic layer has a very uniform surface and thus the recording layer to be grown thereon will have a high uniformity, resulting in insufficient isolation of magnetic particles during the low temperature film formation, thereby increasing noise components.

In the process for alternately laminating non-magnetic metallic thin films and ceramic thin films as a plurality of layers, respectively, (JP-A 2-96921), the noise components are increased, as in case of using the above-mentioned ceramic layer only as a buffer layer, when the outermost surface buffer layer is a ceramic layer. Results of the present inventors' study showed that even in case that the outermost surface layer was a non-magnetic metallic layer, cracks developed and no satisfactory results were obtained when conditions for forming a non-magnetic underlayer was made higher than the Ar gas pressure conditions as disclosed in JP-A 2-96921 to promote physical isolation of recording film layer, thereby increasing SNR. Furthermore, the disclosure of JP-A 2-96921 makes it imperative to laminate substantially at least 5 buffer layers, and in case of production in an in-line type or single piece type sputtering apparatus, a corresponding number of sputtering chambers to the number of laminated layers will be required, resulting in a higher apparatus cost.

When an oxide ceramic buffer layer is formed as the lowest layer, and even if a layer of Ti, Ti alloy or Ti compound is formed thereon, oxygen atoms of the oxide ceramic buffer layer migrate through crystal grain boundaries of Ti, Ti alloy or Ti compound layer into the upper layer, thereby oxidizing the underlayer and the recording magnetic layer, resulting in deterioration of the magnetic characteristics, when exposed to a high temperature or high humidity conditions, since the Ti, Ti alloy or Ti compound layer is crystalline.

As described above, in forming a buffer layer between the resin substrate and the underlayer of a magnetic disk using the resin substrate, the metallic buffer layer has such disadvantages as deterioration of the magnetic characteristics and deterioration at CSS, and the ceramic buffer layer has such disadvantages as deterioration of SNR due to the increased noise level and deterioration of mechanical characteristics. Furthermore, in case of alternately laminating non-magnetic metallic thin films and ceramic thin films as a plurality of layers, respectively, (JP-A 2-96921), cracks develops and no satisfactory results can be obtained, when the Ar gas pressure is increased to obtain an increased SNR during the formation of non-magnetic underlayer.

SUMMARY OF THE INVENTION

An object of the present invention is to provide a magnetic disk using a resin substrate, which is distinguished by SNR, CSS durability, corrosion resistance and mechanical characteristics.

The object can be attained by a magnetic recording medium, which at least comprises an underlayer, a ferromagnetic metallic thin film layer and a protective film layer, successively and continuously laminated on a non-magnetic resin substrate, where (A) at least one of an Si layer, an $Si_wN_xC_yO_z$ layer (where $w+x+y+z=100$ and $w \geq 30$, $0 \leq z \leq 50$ by atomic (at.) %) and an $Al_wN_xC_yO_z$ layer ($w+x+y+z=100$ and $w \geq 30$, $0 \leq z \leq 50$ by atomic (at.) %) and (B) at least one layer composed of silicides, nitrides, oxides, carbides or mixtures of Ti, Ta, Mo, V, Zr and their alloys are laminated on the non-magnetic resin substrate in the order of (A) and (B) between the non-magnetic resin substrate and the underlayer.

Furthermore, the object can be attained by another magnetic recording medium, which at least comprises an underlayer, a ferromagnetic metallic thin film layer, and a protective film layer, successively and continuously laminated on a non-magnetic resin substrate, wherein (i) a layer composed of at least one material selected from the group consisting of Ti, Ta, Mo, V, Zr, Nb and their alloys, (ii) at least one layer selected from the group consisting of an Si layer, an $Si_wN_xC_yO_z$ layer (where $w+x+y+z=100$ at %, $w \geq 30$ at % and $x+y \geq 20$ at %) and an $Al_wN_xC_yO_z$ layer (where $w+x+y+z=100$ at %, $w \geq 30$ at %, $0 \leq z \leq 50$ at % and $x+y \geq 20$ at %), and (iii) a layer composed of at least one material selected from the group consisting of Ti, Ta, Mo, V, Zr and their alloys are laminated on the non-magnetic resin substrate in the order of (i), (ii) and (iii) between the non-magnetic resin substrate and the underlayer.

DETAILED DESCRIPTION OF THE INVENTION

Figure 1:
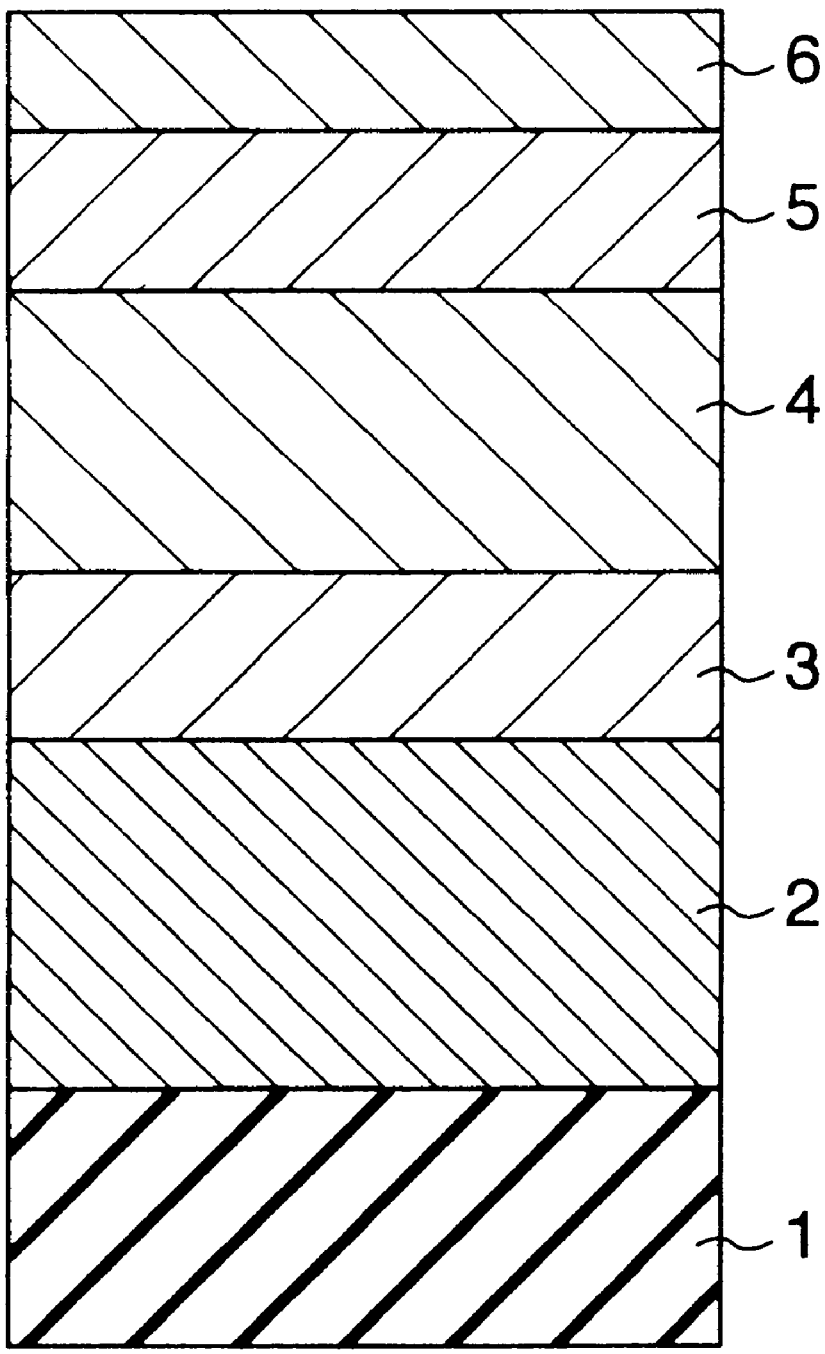
FIG. 1 is a schematic cross-sectional view of a magnetic recording medium obtained according to Example 1 of the present invention and FIG. 2 is a schematic cross-sectional view of another magnetic recording medium obtained according to Example 59 of the present invention, where reference numerals represent: 1 for a resin substrate, 2 for a layer (A), 3 for a layer (B), 4 for an underlayer, 5 for a magnetic layer, 6 for a protective layer, 7 for a layer (i), 8 for a layer (ii) and 9 for a layer (iii).

According to the first embodiment of the present invention, at least one of an Si layer, an SiNCO layer and an AlNCO layer is formed between a resin substrate and an underlayer, thereby preventing crazings caused by the underlayer, where the total film thickness of the Si layer, SiNCO layer and AlNCO layer (layer (A)) is desirably 10 nm to 100 nm, and below 100 nm no crazings can be prevented, whereas above 100 nm the surface of a recording medium will be roughened and suspension characteristic (glide height characteristic) of a magnetic head will be adversely influenced.

Furthermore, a layer (layer (B)) of silicides, nitrides, oxides, carbides or their mixture of Ti, Ta, Mo, V, Zr and their alloys is formed on the layer (A), whereby a noise level can be lowered, as compared with that when only a ceramic layer is formed between the resin substrate and the underlayer, where the film thickness of the layer (B) is desirably 1.5 nm to 50 nm, more preferably 1.5 nm to 20 nm, and below 1.5 nm the lowering of noise level is not satisfactory, whereas above 50 nm mechanical characteristics (plane vibration and warpage) will be deteriorated. By making the oxygen concentration in SiNCO and AlNCO not more than 50 at. % and the concentrations of C and N in total not less than 20 at. %, deterioration of magnetic characteristics, when preserved in a high temperature, high moisture circumstance, can be drastically improved.

According to the second embodiment of the present invention, a layer composed of at least one material selected from the group consisting of Ti, Ta, Mo, V, Zr, Nb and their alloys is formed between a resin substrate and an underlayer as a lowest layer (which will be hereinafter referred to as "layer (i)"), thereby preventing crazings caused by the underlayer, where the film thickness of the layer (i) is desirably within a range of 20 nm to 100 nm, and below 20 nm no crazings can be prevented, whereas above 100 nm the surface of a recording medium will be roughened and suspension characteristics (glide height characteristics) of a magnetic head will be adversely influenced.

Furthermore, an Si layer, an $Si_wN_xC_yO_z$ layer or an $Al_wN_xC_yO_z$ layer (where w, x, y and z have the same meanings as defined above) (the layer will be hereinafter referred to as "layer (ii)") is provided on the above-mentioned layer (i), whereby the CSS durability can be increased and deterioration of magnetic characteristics of a recording film layer can be suppressed even left in a high temperature, high humidity circumstance, where the film thickness of the layer (ii) is desirably in a range of 20 nm to 100 nm, and below 20 nm the effect of improving the CSS durability will be unsatisfactory and also the effect of preventing the deterioration of magnetic characteristics will be unsatisfactory in a high temperature, high humidity circumstance, whereas above 100 nm the surface of a recording medium will be roughened and the suspension characteristics (glide height characteristics) of a magnetic head will be adversely influenced. Particularly, when the layer (ii) is composed of SiNCO or AlNCO, the film thickness is desirably 20 nm to 600 nm. When the film thickness of SiNCO layer or AlNCO layer exceeds 60 nm, the plane vibration and warpage will be drastically increased, resulting in unpreferable deterioration of mechanical characteristics and initiation of crazing.

In both first and second embodiments of the present invention, deterioration of magnetic characteristics can be drastically improved, even when preserved in a high temperature, high humidity circumstance, by making the oxygen concentration not more than 50 at. % and the concentration of C and N in total not more than 20 at. % in the SiNCO or AlNCO layer.

Furthermore, a layer composed of at least one material selected from the group consisting of Ti, Ta, Mo, V, Zr and their alloys (which will be hereinafter referred to as "layer (iii)") is formed on the layer (ii), whereby the noise level can be lowered, as compared with that in the case of the layer immediately below the underlayer being a ceramic layer, where the film thickness of the layer (iii) is desirably in a range of 2 nm to 100 nm, and below 2 nm lowering of noise level will be unsatisfactory, whereas above 100 nm mechanical characteristics (plane vibration and warpage) will be deteriorated.

The underlayer according to the present invention is composed of Cr or Cr alloys (Cr alloys containing at least one of Ti, Ta, Mo, W, Nb, V, Si, Al, Ni, etc.) and M or Mo alloys (Mo alloys containing at least one of Ti, Ta, Cr, W, Nb, V, Si, Al, Ni, etc.), and the recording magnetic layer is composed of a Co alloy such as CoCr, CoPt, CoCrNi, CoCrPt, CoCrNiPt, CoCrPtTa, CoCrPtW, CoCrPtMo, CoCrPtNb, CoCrPtTi, CoNiPt, CoNiPtTa, CoNiPtW, CoNiPtMo, CoNiPtNb, CoNiPtTi, CoCrTa, CoNiCrPtTa, CoNiCrPtW, CoNiCrPtMo, CoNiCrPtNb, CoNiCrPtNi, etc.

The magnetic layer may be divided into at least two layers by a non-magnetic metal such as Cr, Mo, Ag, Cr alloys, etc. or may be composed of direct lamination of at least two layers of Co alloys having different compositions.

Resins for the resin substrate for use in the present invention include such resins as polycarbonate, polystyrene, polymethyl methacrylate, polyolefin, epoxy resins, polyvinyl esters, ultraviolet curable resins, polyethylene terephthalate, polyethylene naphthalate, polyimide, polyamide, polyimide-amide, polyether imide, etc. These resins may be mixed with a filler such as alumina Cr oxide, carbon, etc.

According to the first embodiment of the present invention, the mechanical durability and corrosion resistance can be improved by forming an Si layer, an $Si_wN_xC_yO_z$ layer (w+x+y+z=100 at %, w≧30 at %, 0≦z≦50 at % and x+y=≧20 at %) or $Al_wW_xC_yO_z$ layer between the substrate and the underlayer, and the noise level can be lowered, that is, S/N can be increased by forming thereon at least one layer composed of suicides, nitrides, oxides, carbides or their mixture of Ti, Ta, Mo, V, Zr and their alloys. Furthermore, deterioration of mechanical characteristics can be prevented by making the thickness of the layer composed at silicides, nitrides, oxides, carbides or their mixture of Ti, Ta, Mo, V, Zr and their alloys not more than 50 nm.

Furthermore, according to the second embodiment of the present invention, crazings caused by the under-layer can be prevented by forming a layer (layer (i)) composed of at least one material selected from the group consisting of Ti, Ta, Mo, V, Zr, Nb and their alloys as a lowest layer with a film thickness in a range of 20 nm to 100 nm; the CSS durability and corrosion resistance can be improved by providing an Si layer, an SiNCO layer or an AlNCO layer (layer (ii)) on the layer (i); and the noise level can be lowered, that is, SNR can be improved by further forming a layer (layer (iii)) composed of at least one material selected from the group consisting of Ti, Ta, Mo, V, Zr and their alloys on the layer (ii).

Description of Preferred Embodiments

Examples of the present invention will be described below, referring to drawings.

EXAMPLE 1

FIG. 1 is a schematic cross-sectional view showing the essential structure of a magnetic recording medium obtained according to the first embodiment of the present invention. The magnetic recording medium of this structure was prepared in the following manner:

Onto an amorphous polyolefin resin disk (95 min diameter, 1.2 mm thick and 25 mm in inner diameter) molded by an injection-compression molding machine as a substrate were formed a silicon nitride layer to a thickness of 50 nm, a Ti nitride layer to a thickness of 10 nm, successively a CrTi alloy underlayer to a thickness of 50 nm, a magnetic layer (CoCrPt) to a thickness of 15 nm and finally a carbon protective film layer to a thickness of 20 nm by an in-line type, DC magnetron sputter apparatus. The silicon nitride layer was formed from single crystal silicon target by sputtering with an Ar—$N_2$ mixed gas (in a mixing ratio of 1:1) at a flow rate of 80 sccm (vacuum degree: 1.2 Pa) and an input power of 2 kW; the Ti nitride layer from a Ti target by sputtering with an Ar—$N_2$ mixed gas (in a mixing ratio of 1:1) at a flow rate of 80 sccm (vacuum degree: 1.2 Pa) and an input power of 2 kW in the same manner as for the silicon nitride layer. The CrTi layer was formed from a $Cr_{85}Ti_{15}$ alloy target (by at. %) by sputtering with an Ar gas at a flow rate of 100 sccm (vacuum degree: 1.5 Pa) and an input power of 500 W; the CoCrPt layer from a $Co_{73}Cr_{15}Pt_{12}$ alloy target (by at. %) by sputtering with an Ar gas at a flow rate of 100 sccm (vacuum degree: 1.5 Pa) and an input power of 300 W; and a carbon layer from an amorphous carbon target by sputtering with an Ar gas at a gas flow rate of 50 sccm (vacuum degree: 0.8 Pa) and an input power of 2 kW.

Comparative Example 1

A disk was produced with the same substrate under the same conditions as in Example 1 except that no Ti nitride layer was formed.

Comparative Example 2

A disk was produced with the same substrate under the same conditions as in Example 1 except that no silicon nitride layer was formed.

Comparative Example 3

A disk was produced with the same substrate under the same conditions as in Example 1 except that neither silicon nitride layer nor Ti nitride layer was formed, that is, a disk with a Cr alloy underlayer formed directly on the substrate was prepared.

The magnetic disks of Example 1 and Comparative Examples 1 to 3 were investigated for magnetic characteristics, SNR, mechanical characteristics and durability against head sliding corresponding to the CSS durability in the following manner. Circular plates, 10 mm in diameter, blanked at the disk radius of 30 mm were used as test pieces. For the electromagnetic conversion characteristics, signal (S) and noise (N) were determined by using a combined inductive MR head comprising an inductive head (track length: 4 μm, gap length: 0.4 μm and number of coil turns: 20) as a recording head and an MR (magnetic resistance) head (track length: 3.2 μm and gap length: 0.3 μm) as a read head, writing a signal of 75 kFCI (recording wavelength: 0.339 μm) at 3,600 rpm and the radius of 30 mm by the inductive head, reading the recording pattern by the MR head and inputting the output into a spectrum analyzer Noise components up to 75 MHz were integrated as noises. For the mechanical characteristics, displacements for each turn in the disk vertical direction were measured at the radius of 15 mm (for the inner peripheral part) and the radius of 47 mm (for the outer peripheral part) by a laser doppler apparatus, while turning the disk at 1,000 rpm, and the maximum value (peak to peak) of a difference in the displacements at the outer peripheral part (47 mm) was made "plane vibration" and the maximum value of a difference in the displacements between the inner peripheral part (15 mm) and the outer peripheral part (47 mm) was made as "warpage". To investigate the durability corresponding to the CSS durability, the disk was subjected to continuous sliding at the position of radius of 30 mm with a disk turning of 100 rpm under a load of 1 g with a head of the same material (70% $Al_2O_3$-30% TiC) in the same shape as those of the head slider used for determining the SNR. Disk durability was determined as "deteriorated" when the kinetic friction coefficient exceeded 0.4. All the disks had an initial kinetic friction coefficient of 0.2 to 0.25. Only for the disks whose SNR was to be determined, a perfluorcarbon lubricant of fluorine series was applied to the protective film. Magnetic characteristics, SNR, mechanical characteristics and sliding durability of the magnetic disks of Example 1 and Comparative Examples 1 to 3 are shown in Table 1.

TABLE 1

| Test piece | Coercive force (Oe) | Squareness ratio | Noise (μVrms) | SNR (dB) | Plane vibration (μm) | Warpage (μm) | Number of slidings (pass) |
|---|---|---|---|---|---|---|---|
| Example 1 | 2000 | 0.85 | 11.0 | 25.0 | 20 | 30 | 1200 |
| Comp. Ex. 1 | 2200 | 0.83 | 17.5 | 21.0 | 25 | 28 | 1100 |
| Comp. Ex. 2 | 2000 | 0.84 | 12.0 | 24.0 | 40 | 60 | 220 |

TABLE 1-continued

| Test piece | Coercive force (Oe) | Squareness ratio | Noise (μVrms) | SNR (dB) | Plane vibration (μm) | Warpage (μm) | Number of slidings (pass) |
|---|---|---|---|---|---|---|---|
| Comp. Ex. 3 | 2100 | 0.84 | 18.5 | 20.5 | 18 | 45 | 50 |

As is evident from the results shown in Table 1, residual magnetizations per unit area (Mr×t) of the individual magnetic disks of Example 1 and Comparative Examples 1 to 3 were almost constant, i.e., 1 to 1.1 memu/cm$^2$. Noise of the magnetic disks of Example 1 and Comparative Example 2, each with a Ti nitride layer were lowered, whereas SNRs were increased. Durability against the head sliding was increased in the magnetic disks of Example 1, and Comparative Example 1 each having a silicon nitride layer. Thus, it can be seen that it is the magnetic disk of Example that had an increased SNR and an improved durability against the head sliding.

EXAMPLES 2 to 24

Onto the same substrates under the same conditions as in Example 1, disks with Ta nitride, Mo nitride, V nitride, Zr nitride, TaTi nitride, ZrTi nitride, Ti oxide, Ta oxide, Mo oxide, V oxide, Zr oxide, Ti carbide, Ta carbide, Mo carbide, V carbide, Zr carbide, Ti silicide, Ta silicide, Mo silicide, V silicide, Zr silicide, partially oxidizer Ti nitride ($TiN_xO_y$) and partially carbonized Ti nitride ($TiN_xO_y$), respectively, were formed in place of the Ti nitride layer. In place of the Ar—$N_2$ mixed gas, an Ar—$O_2$ mixed gas (in a mixing ratio of 5:1) was used for the formation of oxide layers and an Ar—$CH_4$ mixed gas (in a mixing ratio of 2:1) was used for the formation of carbide layer. For the silicides, silicon chips were placed in the erosion area of the respective targets of Ti, Ta, Mo, V and Zr so as to take 30% of the erosion area, followed by sputtering with an Ar gas to form the respective layers. Magnetic characteristics, SNR, mechanical characteristics and sliding durability of the respective disks obtained in Examples 2 to 24 were determined in the same manner as mentioned above. Results of determinations are shown in the following Table 2.

TABLE 2

| Example No. | Intermediate layer | Coercive force (Oe) | Squareness ratio | Noise (μVrms) | SNR (dB) | Plane vibration (μm) | Warpage (μm) | Number of slidings (pass) |
|---|---|---|---|---|---|---|---|---|
| 2 | TaNx | 2050 | 0.83 | 11.7 | 24.5 | 22 | 33 | 1000 |
| 3 | MoNx | 2030 | 0.83 | 11.6 | 24.6 | 23 | 35 | 1100 |
| 4 | VNx | 1950 | 0.82 | 11.4 | 24.7 | 22 | 34 | 1150 |
| 5 | ZrNx | 2150 | 0.84 | 10.4 | 25.5 | 21 | 33 | 1200 |
| 6 | (TaTi)Nx | 2025 | 0.82 | 10.8 | 25.1 | 23 | 34 | 1110 |
| 7 | (ZrTi)Nx | 2018 | 0.83 | 10.6 | 25.3 | 21 | 32 | 1120 |
| 8 | TiOx | 1900 | 0.80 | 11.6 | 24.5 | 28 | 38 | 1000 |
| 9 | TaOx | 1950 | 0.80 | 12.3 | 24.0 | 27 | 40 | 990 |
| 10 | MoOx | 1940 | 0.79 | 12.0 | 24.2 | 30 | 41 | 1020 |
| 11 | VOx | 1890 | 0.81 | 12.2 | 24.0 | 29 | 39 | 1030 |
| 12 | ZrOx | 2100 | 0.82 | 11.7 | 24.5 | 26 | 36 | 1050 |
| 13 | TiCx | 2200 | 0.82 | 10.3 | 25.5 | 25 | 37 | 1080 |
| 14 | TaCx | 2150 | 0.82 | 11.5 | 24.5 | 26 | 39 | 1020 |
| 15 | MoCx | 2170 | 0.83 | 11.2 | 24.8 | 27 | 39 | 1040 |
| 16 | VCx | 2140 | 0.81 | 11.3 | 24.7 | 26 | 37 | 1070 |
| 17 | ZrCx | 2250 | 0.83 | 10.5 | 25.4 | 24 | 34 | 1100 |

TABLE 2-continued

| Example No. | Intermediate layer | Coercive force (Oe) | Squareness ratio | Noise (μVrms) | SNR (dB) | Plane vibration (μm) | Warpage (μm) | Number of slidings (pass) |
|---|---|---|---|---|---|---|---|---|
| 18 | TiSix | 2010 | 0.81 | 10.6 | 25.3 | 22 | 25 | 1050 |
| 19 | TaSix | 1980 | 0.82 | 10.8 | 25.2 | 21 | 28 | 1030 |
| 20 | MoSix | 1970 | 0.81 | 10.7 | 25.2 | 25 | 26 | 1040 |
| 21 | VSix | 2000 | 0.80 | 11.0 | 25.0 | 26 | 24 | 1080 |
| 22 | ZrSix | 2050 | 0.82 | 10.6 | 25.3 | 22 | 24 | 1100 |
| 23 | TiNxOy | 2050 | 0.82 | 10.9 | 25.0 | 23 | 31 | 1150 |
| 24 | TiNxCy | 2080 | 0.83 | 10.6 | 25.3 | 22 | 32 | 1210 |

EXAMPLES 25 to 27

Onto the same substrates under the same conditions as in Example 1, disks were formed by laminating Ta oxide and Ti nitride, Ti nitride and Zr carbide, and Mo silicide and V oxide in this order to a layer thickness each of 5 nm, respectively, in place of the Ti nitride layer. The nitrides, oxides, carbide and silicide were formed as films in the same manner as in Examples 1 to 24. Magnetic characteristics, SNR, mechanical characteristics and sliding durability of the respective disks obtained in Examples 25 to 27 were determined in the same manner as mentioned above. Results of determination are shown in the following Table 3.

TABLE 3

| Test piece | Coercive force (Oe) | Squareness ratio | Noise (μVrms) | SNR (dB) | Plane vibration (μm) | Warpage (μm) | Number of slidings (pass) |
|---|---|---|---|---|---|---|---|
| Example 25 | 2000 | 0.83 | 10.3 | 25.5 | 22 | 32 | 1250 |
| Example 26 | 2080 | 0.84 | 10.5 | 25.4 | 24 | 35 | 1150 |
| Example 27 | 1950 | 0.82 | 11.6 | 24.5 | 28 | 40 | 1000 |

As is evident from the results shown in the foregoing Tables 2 and 3, the respective disks obtained in Examples 2 to 24 and 25 to 27 show equivalent SNR, mechanical characteristics and sliding characteristics to those of the magnetic disk of Example 1.

EXAMPLES 28 to 37

Onto polycarbonate resin disks (64 mm in diameter, 1.2 mm thick and 20 mm in inner diameter) molded by an injection compression molding machine as substrates were formed an aluminum nitride layer to a thickness of 50 nm, a Ti nitride layer to a thickness of 0, 1, 1.5, 2, 10, 20, 30, 40, 50 or 60 nm thereon, and successively a CrMo alloy underlayer to a thickness of 50 nm, a magnetic layer (CoCrPtTa) to a thickness of 15 nm and finally a carbon protective film layer to a thickness of 20 nm, respectively, by an in-line type, DC magnetron sputter apparatus. The aluminum nitride layer was formed from an aluminum target by sputtering with an Ar—$N_2$ mixed gas (in a mixing ratio of 1:1) at a flow rate of 80 sccm (vacuum degree: 1.2 Pa) and an input power of 2 kW; a Ti nitride layer from a Ti target by sputtering with an Ar—$N_2$ mixed gas (in a mixing ratio of 1:1) at a flow rate of 80 sccm (vacuum degree: 1.2 Pa) and an input power of 2 kW in the same manner as for the aluminum nitride layer. The CrMo layer was formed from a $Cr_{90}Mo_{10}$ alloy target (by at. %) by sputtering with an Ar gas at a flow rate of 100 sccm (vacuum degree: 1.5 Pa) and an input power of 500 W, a CoCrPtTa layer from a $Co_{71}Cr_{15}Pt_{12}Ta_2$ alloy target (by at. %) by sputtering with an Ar gas at a flow rate of 100 sccm (vacuum degree: 1.5 Pa) and an input power of 300 W and a carbon layer from an amorphous carbon target by sputtering with an Ar—$CH_4$ gas (in a mixing ratio of 10:3) at a gas flow rate of 50 sccm (vacuum degree: 0.8 Pa) and an input power of 2 kW. The following Table 4 shows the results of determination of SNR, plane vibration warpage. The SNR was determined by measurement at the radius of 12 mm, and the plane vibration and the warpage were determined by measurement at the radius of 12 mm for the inner peripheral part and at the radius of 31 mm for the outer peripheral part in the same manner as in Example 1.

TABLE 4

| Test piece | Thickness of Ti Nitride film (nm) | Noise (μVrms) | SNR (dB) | Plane vibration (μm) | Warpage (μm) |
|---|---|---|---|---|---|
| Example 28 | 0 | 18.0 | 20.5 | 15 | 25 |
| Example 29 | 1.0 | 15.2 | 22.0 | 18 | 24 |
| Example 30 | 1.5 | 12.0 | 24.0 | 18 | 25 |
| Example 31 | 2.0 | 11.2 | 24.5 | 19 | 27 |
| Example 32 | 10.0 | 11.5 | 24.3 | 20 | 29 |
| Example 33 | 20.0 | 11.8 | 24.1 | 20 | 35 |
| Example 34 | 30.0 | 11.9 | 24.0 | 25 | 45 |
| Example 35 | 40.0 | 12.0 | 24.0 | 30 | 47 |
| Example 36 | 50.0 | 12.1 | 23.9 | 45 | 50 |
| Example 37 | 60.0 | 12.0 | 23.9 | 80 | 70 |

The respective magnetic disks of Examples 28 to 37 showed substantially the same magnetic characteristics, i.e. coercive forces of 1950–2050 Oe, MrT=1–1.1 memu/$cm^2$ and squareness ratios of 0.81–0.83. SNR was improved by at least 3 dB when the thickness of the Ti nitride film was at least 1.5 nm, as compared with the case of no Ti nitride film, whereas the mechanical characteristics (plane vibration and warpage) were both satisfactory, i.e. not more than 50 μm, when the thickness of the Ti nitride film was not more than 50 nm, but were drastically deteriorated at 60 nm, i.e. 80 μm for the plane vibration and 70 μm for the warpage. Furthermore, when the thickness of the Ti nitride film was not more than 20 μm, the plane vibration was more satisfactory, i.e. not more than 20 μm. the film thickness of the Ti nitride layer, i.e. layer (B) is desirably 1.5 nm–50 nm, more desirably 1.5 nm–20 nm.

EXAMPLES 38 to 43

Onto polyether imide resin disks (95 mm in diameter, 1.2 mm thick and 25 mm in inner diameter) molded by an injection compression molding machine as substrates were formed an SiNCO layer to a thickness of 50 nm and a Zr nitride layer to a thickness of 5 nm thereon, and successively a CrV alloy underlayer to a thickness of 50 nm, a magnetic layer (CoNiCrPt) to a thickness of 20 nm and finally a carbon protective layer to a thickness of 20 nm. The SiNCO layer was formed from a silicon target by sputtering with an appropriately mixed gas of Ar, $N_2$, $O_2$ and $CH_4$ in a desired mixing ratio through a mass flow controller to control the composition of N, C and O of the layer. Flow rate of the mixed gas at the silicon sputtering was set to 80 sccm (vacuum degree: 1.2 Pa) at an input power of 2 kW. The Zr nitride layer was formed from a Zr target by sputtering with an Ar—$N_2$ mixed gas (in a mixing ratio of 1:1) at a flow rate of 80 sccm (vacuum degree: 1.2 Pa) and an input power of 2 kW. The CrV layer was formed from a $Cr_{85}V_{15}$ alloy target (by at. %) by sputtering with an Ar gas at a flow rate of 100 sccm (vacuum degree: 1.5 Pa) and an input power of 500 W, a CoNiCrPt layer was formed from $Co_{63}Ni_{10}Cr_{15}Pt_{12}$ alloy target (by at. %) by sputtering with an ar gas at a flow rate of 100 sccm (vacuum degree: 1.5 Pa) and an input power of 300 W, and the carbon layer was formed from an amorphous carbon target by sputtering with an Ar—$N_2$ gas (in a mixing ratio of 10.3) at a gas flow rate of 50 sccm (vacuum degree: 0.8 Pa) and an input power of 2 kW.

By changing the mixing ratio of the mixed gas at the sputtering of the silicon target disks with the SiNCO layer having oxygen contents of 0, 10, 20, 40, 50 and 60 at. %, respectively, were prepared, while keeping a ratio of Si:N:C at 3:2:2. The composition of the SiNCO layer could be obtained by forming only a SiNCO film in advance and analyzing the composition of the formed layer by XPC (X-ray photoelectron spectroscopy), thereby determining the necessary mixing ratio of the mixed gas for establishing the desired film composition.

Magnetic characteristics, SNR and mechanical characteristics of the respective magnetic disks of Examples 38 to 43, as determined in the same manner as in Example 1, were found substantially the same as those of Example 1, independent of the composition of the SiNCO layer, i.e. magnetization per unit area: Mrt=1.2–1.3 memu/cm$^2$, coercive force: Hc=2,200–2,300 Oe, squareness ratio: s=0.81–0.85, integrated noise level at recording and reproduction of 75 kFCI signal=10.2–10.4μ Vrms, SNR=26–26.5 dB, plane vibration=25–30 μm, warpage=30–32 μm and sliding characteristic=1,000–1,300 passes. The respective magnetic disks of Examples 38 to 43 were investigated for changes in magnetic characteristics (particularly coercive force and magnetization), mechanical characteristics (plane vibration and warpage) when preserved under high temperature, high humidity conditions (temperature: 60° C. and relative humidity: 90% RH). Magnetic characteristics were measured by a test piece vibration-type magnetometer and mechanical characteristics were determined in the same manner as in Example 1. The following Table 5 shows the initial values and values after 1,000-hr preservation of the magnetic characteristics and Table 6 shows the initial values and values after 1,000-hr preservation of the mechanical characteristics.

TABLE 5

| Test piece | Oxygen content (at %) | Initial values | | Values after 1,000-hr preservation | |
|---|---|---|---|---|---|
| | | Coercive force (Oe) | Mrt (memu/cm$^2$) | Coercive force (Oe) | Mrt (memu/cm$^2$) |
| Example 38 | 0 | 2300 | 1.3 | 2290 (−0.43%) | 1.27 (−2.0%) |
| Example 39 | 10 | 2260 | 1.28 | 2280 (+0.88%) | 1.25 (−2.2%) |
| Example 40 | 20 | 2280 | 1.29 | 2340 (+2.63%) | 1.26 (−2.2%) |
| Example 41 | 40 | 2230 | 1.26 | 2300 (+3.14%) | 1.22 (−3.5%) |
| Example 42 | 50 | 2250 | 1.25 | 2350 (+4.44%) | 1.19 (−5.0%) |
| Example 43 | 60 | 2200 | 1.22 | 2500 (+13.6%) | 1.10 (−10.0%) |

(Note) In Table 5, figures in parentheses for the values after 1,000-hr preservation show percent variation on the basis of the initial values, respectively, and the plus sign prefixed to the figures means an increment, whereas the minus sign means a decrement.

As is evident from the results shown in Table 5, since the magnetic film is oxidized by preservation under high temperature, high humidity conditions, the magnetization is reduced, whereas the coercive force is increased to some extent of oxidation. In Examples 38 to 43, the magnetization is reduced and the coercive force is increased by the preservation under high temperature, high humidity conditions, and their degrees are increased with increasing oxygen concentration of the SiCNO film. Observation of the film surfaces of Examples 38 to 43 revealed that 1 to 2 pittings, about 1 μm in diameter, were found per 50 μm$^2$ in Example 42 and about 10 pittings, about 8–10 μm in diameter, were found per 50 μm$^2$ in Example 43, while no such pittings were found at all in Examples 38 to 41. Upon investigation of the pittings by a micro-Auger spectroscopic analyzer, Co and oxygen mainly were detected, and thus it can be seen from this that corrosion products of the magnetic reached the surface through the microcracks in the carbon protective film. Since corrosion, particularly pittings, of the magnetic film takes place more vigorously with increasing oxygen concentration of the SiNCO layer, it seems that pitting took place by a combined action of water passing through the microcracks of the carbon protective film to the magnetic layer and oxygen passing from the SiNCO layer through the grain boundaries of the nitride layer and the Cr alloy layer formed thereon to the magnetic layer.

TABLE 6

| Test piece | Oxygen content (at %) | Initial values | | Values after 1,000-hr preservation | |
|---|---|---|---|---|---|
| | | Plane vibration (μm) | Warpage (μm) | Plane vibration (μm) | Warpage (μm) |
| Example 38 | 0 | 29.5 | 30.0 | 28.0 (−5.1%) | 28.0 (−6.7%) |
| Example 39 | 10 | 29.5 | 31.0 | 32.0 (+8.5%) | 32.0 (+3.2%) |
| Example 40 | 20 | 27.2 | 32.0 | 35.0 (+28.6%) | 40.0 (+25.0%) |

TABLE 6-continued

|  | Initial values | | Values after 1,000-hr preservation | |
| --- | --- | --- | --- | --- |
| Test piece | Oxygen content (at %) | Plane vibration (μm) | Warpage (μm) | Plane vibration (μm) | Warpage (μm) |
| Example 41 | 40 | 26.5 | 30.5 | 32.0 (+20.8%) | 41.0 (+34.4%) |
| Example 42 | 50 | 25.0 | 30.2 | 40.0 (+60.0%) | 45.0 (+49.0%) |
| Example 43 | 60 | 25.0 | 30.0 | 50.0 (+100%) | 65.0 (+217.0%) |

(Note) In Table 6, figures in parentheses for values after 1,000-hr preservation show percent variation on the basis of the initial values, and the plus sign prefixed to the figures means an increment, whereas the minus sign means a decrement.

As is evident from the results shown in Table 6, both plane vibration and warpage are increased at the preservation under high temperature, high humidity conditions, and their degrees are increased with increasing oxygen concentration of the SICNO film. It seems that, with progress of corrosion in the film, the stress in the film due to the corrosion increases and the stress distribution through the film becomes uneven, resulting in such a large deformation.

The results shown in Tables 5 and 6 reveal that the oxygen concentration of the SiCNO film is desirably not more than 50 at. %.

EXAMPLES 44 to 49

Onto polyether imide resin disks (95 mm in diameter, 1.2 mm thick and 25 mm in inner diameter) molded by an injection compression molding machine as substrates were formed an AlNCO layer to a thickness of 50 nm, a Zr carbide layer to a thickness of 5 nm thereon, and successively a CrSi alloy underlayer to a thickness of 50 nm, a magnetic layer (CoNiCrPt) to a thickness of 20 nm and finally a carbon protective layer to a thickness of 20 nm by an in-line type, DC magnetron sputter apparatus. The AlNCO layer was formed from an aluminum target by sputtering with an appropriately mixed gas of Ar, $N_2$, $O_2$ and $CH_4$ in a desired mixing ratio through a mass flow controller to control the composition of N, C and O of the layer. Flow rate of the mixed gas at the aluminum sputtering was set to 80 sccm (vacuum degree: 1.2 Pa) at an input power of 2 kW. The Zr carbide layer was formed from a Zr target by sputtering with an Ar—$CH_4$ mixed gas (in a mixing ratio of 1:1) at a flow rate of 80 sccm (vacuum degree: 1.2 Pa) and an input power of 2 kW. The (CrSi layer was formed from a $Cr_{90}Si_{10}$ alloy target (by at. %) by sputtering with an Ar gas at a flow rate of 100 sccm (vacuum degree: 1.5 Pa) and an input power of 500 W, the CoNiCrPt layer was formed from a $Co_{63}Ni_{10}Cr_{15}Pt_{12}$ alloy target (by at. %) by sputtering with an Ar gas at a flow rate of 100 sccm (vacuum degree: 1.5 Pa) and an input power of 300 W, and the carbon layer was formed from an amorphous carbon target by sputtering with an Ar—$H_2$ gas (in a mixing ratio of 10:2) at a gas flow rate of 50 sccm (vacuum degree: 0.8 Pa) and an input power of 2 kW.

By changing the mixing ratio of the mixed gas at the sputtering of the aluminum target disks with the AlNCO layer ($(AlNC)_xO_y$) having oxygen contents of 0, 10, 20, 40, 50 and 60 at. %, respectively, were prepared, while keeping a ratio of Al:N:C at 2:1:1. The composition of the AlNCO film could be obtained by forming only an AlNCO film in advance and analyzing the composition of the formed layer by XPS (X-ray photoelectron spectroscopy), thereby determining the necessary mixing ratio of the mixed gas for establishing the desired film composition.

Magnetic characteristics, SNR and mechanical characteristics of the respective magnetic disks of Examples 44 to 49, as determined in the same manner as in Example 1, were found substantially the same as those of Example 1, independent of the composition of the AlNCO layer, i.e. magnetization per unit area: Mrt=1.2–1.3 memu/cm$^2$, coercive force: Hc=1,900–2,000 Oe, squareness ratio: S=0.81–0.85, integrated noise level at recording and reproduction of 75 kFCI signal=11.2–11.4μ Vrms, SNR=23–23.5 dB, plane vibration=30–35 μm, warpage=35–40 μm and sliding characteristic=1,200–1,400 passes. The respective magnetic disks of Examples 44 to 49 were investigated for changes in magnetic characteristics (particularly coercive force and magnetization), mechanical characteristics (plane vibration and warpage, when preserved under high temperature, high humidity conditions (temperature: 60° C. and relative humidity: 90% RH). Magnetic characteristics were measured by a test piece vibration-type, magnetometer and mechanical characteristics were determined in the same manner as in Example 1. Table 7 shows the initial values and values after 1,000-hr preservation of the magnetic characteristics Table 8 shows the initial values and values after 1,000-hr preservation of the mechanical characteristics.

TABLE 7

|  | Initial values | | | Values after 1,000-hr preservation | |
| --- | --- | --- | --- | --- | --- |
| Test piece | Oxygen content (at %) | Coercive force (Oe) | Mrt (memu/ cm$^2$) | Coercive force (Oe) | Mrt (memu/cm$^2$ |
| Example 44 | 0 | 1990 | 1.29 | 1990 (0.0%) | 1.28 (−0.8%) |
| Example 45 | 10 | 1980 | 1.29 | 2010 (+1.5%) | 1.28 (−0.8%) |
| Example 46 | 20 | 1940 | 1.27 | 2000 (+3.1%) | 1.24 (−2.4%) |
| Example 47 | 40 | 1950 | 1.26 | 2050 (+5.1%) | 1.22 (−3.2%) |
| Example 48 | 50 | 1915 | 1.24 | 2035 (+6.3%) | 1.15 (−7.3%) |
| Example 49 | 60 | 1910 | 1.25 | 2400 (+25.7%) | 1.10 (−12.0%) |

(Note) In Table 7, figures in parentheses for values after 1,000-hr preservation show percent variations on the basis of the initial values, respectively, and the plus sign prefixed to the figures means an increment, whereas the minus sign means a decrement.

TABLE 8

| Test piece | Oxygen content (at %) | Initial values | | Values after 1,000-hr preservation | |
|---|---|---|---|---|---|
| | | Plane vibration ($\mu$m) | Warpage ($\mu$m) | Plane vibration ($\mu$m) | Warpage ($\mu$m) |
| Example 44 | 0 | 26.4 | 30.0 | 27.0 (+2.3%) | 30.0 (0.0%) |
| Example 45 | 10 | 26.5 | 30.0 | 33.0 (+24.5%) | 33.0 (+10.0%) |
| Example 46 | 20 | 27.0 | 29.0 | 33.5 (+24.1%) | 35.0 (+20.7%) |
| Example 47 | 40 | 27.0 | 32.0 | 34.0 (+25.9%) | 40.5 (+26.6%) |
| Example 48 | 50 | 26.5 | 31.0 | 39.0 (+47.2%) | 46.5 (+50.0%) |
| Example 49 | 60 | 26.0 | 30.5 | 51.5 (+98.1%) | 65.0 (+213.1%) |

(Note) In Table 8, figures in parentheses for values after 1,000-hr preservation show percent variations on the basis of the initial values, respectively, and the plus sign prefixed to the figures means an increment, whereas the minus sign means a decrement.

As is evident from the results shown in Tables 7 and 8, even the AlNCO film undergoes vigorous deterioration of magnetic characteristics and mechanical characteristics, when preserved under high temperature, high humidity conditions, with increasing oxygen concentration of the AlNCO film, as in the case of the SiNCO film. Thus, it can be seen that the oxygen concentration of the AlNCO film is desirably not more than 50 at. %.

EXAMPLES 50 to 58

Onto epoxy resin disks (95 mm in diameter, 1.2 mm thick and 25 mm in inner diameter) molded by cast molding as substrates were formed an $Si_{50}N_{35}C_5O_{10}$ layer and a Ti nitride layer to a thickness of 5 nm thereon, and successively a CrTi alloy underlayer to a thickness of 50 nm, a magnetic layer (CoCrPt) to a thickness of 15 nm and finally a carbon protective layer to a thickness of 20 nm by an in-line type, Dc magnetron sputter apparatus. The $Si_{50}N_{35}C_5O_{10}$ layer was formed from a silicon target by sputtering with a mixed gas of Ar, $N_2$ and $CO_2$ in a mixing ratio of 5:7:1 through a mass flow controller in a flow rate of 80 sccm (vacuum degree: 1.2 Pa) and an input power of 2 kW in a sputter chamber. The Ti nitride layer was formed from a Ti target by sputtering with an Ar—$N_2$ mixed gas (in a mixing ratio of 1:1) at a flow rate of 80 sccm (vacuum degree: 1.2 Pa) and an input power of 2 kW. The CrTi layer was formed from a $Cr_{90}Ti_{10}$ alloy target (by at. %) by sputtering with an Ar gas at a flow rate of 100 sccm (vacuum degree: 1.5 Pa) and an input power of 500 W, the CoCrPt layer was formed from a $Co_{70}Cr_{15}Pt_{15}$ alloy target (by at. %) by sputtering with an Ar gas at a flow rate of 100 sccm (vacuum degree: 1.5 Pa) and an input power of 300 W, and the carbon layer was formed from an amorphous carbon target by sputtering with an Ar—$H_2$ gas (in a mixing ratio of 10:2) at a flow rate of 50 sccm (vacuum degree: 0.8 Pa) and an input power of 2 kW. Disks with the $Si_{50}N_{35}C_5O_{10}$ layer having a thickness of 5, 10, 20, 40, 60, 80, 100, 120 and 140 nm, respectively, were prepared.

Magnetic characteristics, SNR and mechanical characteristics of the respective magnetic disks of Examples 50 to 58 were determined in the same manner as in Example 1, and it was found that the magnetic characteristics and SNR were substantially the same as those of Example, independent of the film thickness of the SiNCO layer, i.e. magnetization per unit area: Mrt=1.0–1.0 memu/cm², coercive force: Hc=2, 300–2,400 Oe, squareness ratio S=0.81–0.85, integrated noise level at recording and reproduction of 75 kFCI= 11.2–11.4$\mu$ Vrms, SNR=23.5–24.0 dB. The following Table 9 shows results of determination of mechanical characteristics (plane vibration and warpage) and sliding characteristic.

TABLE 9

| | Thickness of $Si_{50}N_{35}C_5O_{10}$ layer (nm) | Plane vibration ($\mu$m) | Warpage ($\mu$m) | Number of slidings (pass) |
|---|---|---|---|---|
| Example 50 | 5 | 18 | 25 | 500 |
| Example 51 | 10 | 25 | 30 | 900 |
| Example 52 | 20 | 22 | 28 | 1000 |
| Example 53 | 40 | 23 | 30 | 1250 |
| Example 54 | 60 | 26 | 35 | 1350 |
| Example 55 | 80 | 30 | 43 | 1450 |
| Example 56 | 100 | 35 | 46 | 1200 |
| Example 57 | 120 | 60 | 65 | 800 |
| Example 58 | 140 | 90 | 95 | 650 |

As is evident from the results shown in Table 9, the mechanical characteristics, i.e. both plane vibration and warpage undergo abrupt deterioration, when the thickness of the $Si_{50}N_{35}C_5O_{10}$ layer exceeds 100 $\mu$m, because, with increasing thickness of the $Si_{50}N_{35}C_5O_{10}$ layer, the total input energy (=input power+sputtering time) increases at the sputtering, resulting in increased disk-susceptible heat quantity and consequent thermal degradation to cause deformation of the substrate. The deformation of the substrate leads to deterioration of sliding durability. Poor sliding durability of a thinner $Si_{50}N_{35}C_5O_{10}$ layer is due to the thinness of the $Si_{50}N_{35}C_5O_{10}$ layer which supports the head load and to the consequent easy cracking of the $Si_{50}N_{35}C_5O_{10}$ layer. Thus, the $Si_{50}N_{35}C_5O_{10}$ layer, that is, the layer (A) of the present invention, desirably has a film thickness of 10 nm to 100 nm.

EXAMPLE 59

Figure 2:
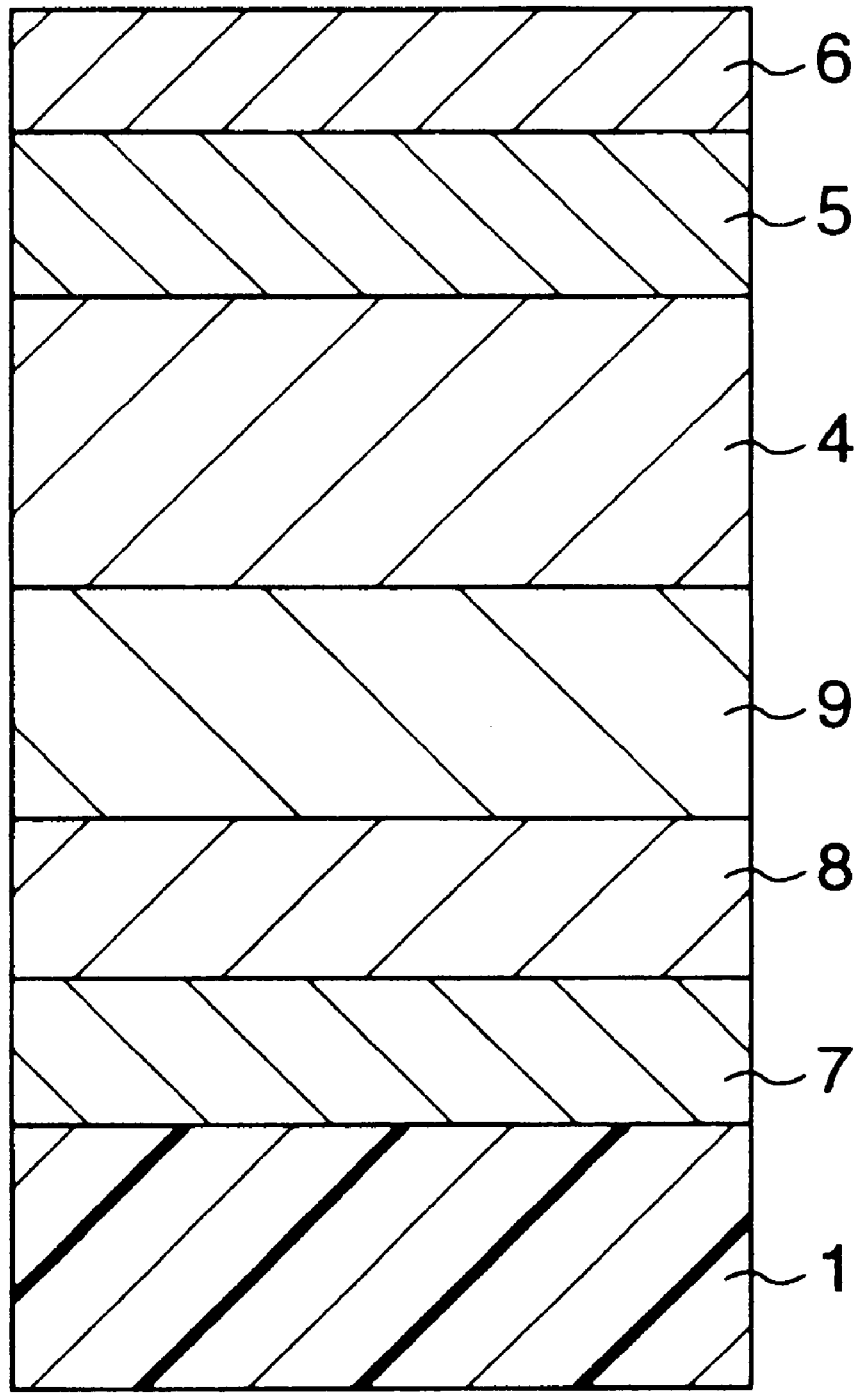

FIG. 2 is a schematic cross-sectional view of the essential structure of a magnetic recording medium according to the second embodiment of the present invention. The magnetic recording medium of this structure were prepared in the following manner: onto amorphous polyolefin resin disks (95 mm in diameter, 1.2 mm thick and 25 mm in inner diameter) molded by an injection compression molding machine as substrates were formed (i) a Ti layer to a thickness ranging from 10 to 150 nm, (ii) a Si layer to a fixed thickness of 40 nm and (iii) a Ti layer to a fixed thickness of 50 nm thereon in the order of the Ti layer (i), the Si layer (ii) and the Ti layer (iii), and successively a CrTi alloy underlayer to a thickness of 50 nm, a magnetic layer (CoCrPt) to a thickness of 16 nm and a C protective layer to a thickness of 15 nm by an in-line type, Dc magnetron sputter apparatus. The Ti layer (i), the Si layer (ii) and the Ti layer (iii) were formed under an Ar gas pressure of 1.2 Pa and at an input power of 2 kW, and the Crti layer and the CoCrPt layer were formed under an Ar gas pressure of 4 Pa and at an input power of 500 W, and further the C protective layer was formed under an Ar gas pressure of 0.8 Pa and at an input power of 1.0 kW.

EXAMPLE 60

Magnetic disks were prepared on the same substrates under the same conditions as in Example 59, except that the thickness of the Ti layer (i) was fixed to 50 nm and the thickness of the Ti layer (iii) was also fixed to 50 nm, while the thickness of the Si layer (ii) was changed in a range of 10 nm to 150 nm.

EXAMPLE 61

Magnetic disks were prepared on the same substrates under the same conditions as in Example 59, except that the thickness of the Ti layer (i) was fixed to 50 nm and the Si layer (ii) was fixed to 40 nm, while the thickness of the Ti layer (iii) was changed in a range of 2 nm to 150 nm.

Comparative Example 4

A magnetic disk was prepared on the same substrate under the same conditions as in Example 59, except that no such Ti layer (i) was formed, while the thickness of the Si layer (ii) was fixed to 40 nm and the thickness of the Ti layer (iii) was fixed to 50 nm.

Comparative Example 5

A magnetic disk was prepared on the same substrate under the same conditions as in Example 59, except that no such Si layer (ii) was formed, that is, only the Ti layer was formed between the substrate and the CrTi underlayer, and the thickness of the Ti layer was made 100 nm.

Comparative Example 6

A magnetic disk was prepared on the same substrate under the same conditions as in Example 59, except that no such Ti layer (iii) was formed, while the thickness of the Ti layer (i) was made 50 nm and the thickness of the Si layer (ii) was made 40 nm.

Comparative Example 7

A magnetic disk was prepared on the same substrate under the same conditions as in Example 59, except that no such Ti layer (i), Si layer (ii) and Ti layer (iii) were formed, that is, the CrTi underlayer was directly formed on the substrate.

Comparative Example 8

A magnetic disk was prepared on the same substrate under the same conditions as in Example 59, except that 5 layers each of a ti layer and a Si layer were alternately formed each to a thickness of 5 nm between the substrate and the CrTi underlayer. Other conditions than for the thicknesses of the Ti layers and the Si layers were made the same as in Example 1.

The respective magnetic disks obtained in Examples 59 to 61 and Comparative Examples 4 to 8 were determined in the following manner for magnetic characteristics, electromagnetic conversion characteristics (SNR and noise), mechanical characteristics and CSS durability. Magnetic characteristics were measured by a test piece vibration-type magnetometer. Test pieces were prepared by blanking the disks into circular plates, 10 mm in diameter, at the disk radius of 30 mm. For the electromagnetic conversion characteristics, signals and noises were measured by using an MR/inductive combined head (recording inductive head: track width 4 μm, gap length 0.4 μm and number of coil turns: 20; reproduction MR head: track width 3.2 μm and gap length 0.35 μm), inputting a reproduction output with a signal recording density of 75 kFCI at 3,600 rpm and the radius of 30 mm into a spectrum analyzer. Noise was obtained by integration of band width of 75 MHz. For the mechanical characteristics, displacements for each turn in the disk vertical direction were measured at the radius of 15 mm (for the inner peripheral part) and the radius of 47 mm (for the outer peripheral part) by a laser doppler apparatus, while turning the disk at 1,000 rpm, and the maximum value of a difference in the displacements at the outer peripheral part (47 mm) was made "plane vibration" and the maximum value of a difference in the displacements between the inner peripheral part (15 mm) and the outer peripheral part (47 mm) was made "warpage". CSS durability was determined by a CSS test of maximum 5,000 cycles at the position of the radius of 25 mm under a head load of 3.5 g until the medium was damaged, where each cycle consisted of a duration of 3 seconds from the standstill state to the acceleration, a duration 5 seconds at a constant turning speed (3,600 rpm), a duration of 5 seconds of deaccelaration and a duration of 12 seconds at the standstill state. Only for the disks whose electromagnetic conversion characteristics (SNR and noise) were to be determined, a perfluorocarbon lubricant of fluorine series was applied onto the protective film. Furthermore, the surface of the medium was observed in several visual fields in an artrary region on the same medium by an optical microscope with 200 magnifications and the degree of film cracks was evaluated as "○" for no observation of film cracks at all in any of visual fields, as "Δ" for the observation of film cracks in some of the visual fields and as "x" for the observation of film cracks in all the visual fields.

The thicknesses of Ti layer (i), Si layer (ii) and Ti layer (iii) of the respective magnetic disks prepared in Examples 59 to 61 and Comparative Examples 4 to 8 are summarized in the following Table 10. Furthermore, results of magnetic characteristics, electromagnetic conversion characteristics (SNR and noise), mechanical characteristics, CSS durability and degrees of film cracks of the respective magnetic disks obtained in Examples 59 to 61 and Comparative Examples 4 to 8 are summarized in the following Table 11.

TABLE 10

| Disks | Thickness of Ti layer (i) (nm) | Thickness of Si layer (ii) (nm) | Thickness of Ti layer (iii) (nm) |
|---|---|---|---|
| Example 59 | | | |
| (1) | 10 | 40 | 50 |
| (2) | 20 | 40 | 50 |
| (3) | 30 | 40 | 50 |
| (4) | 50 | 40 | 50 |
| (5) | 100 | 40 | 50 |

TABLE 10-continued

| Disks | Thickness of Ti layer (i) (nm) | Thickness of Si layer (ii) (nm) | Thickness of Ti layer (iii) (nm) |
|---|---|---|---|
| (6) | 150 | 40 | 50 |
| Example 60 | | | |
| (1) | 50 | 10 | 50 |
| (2) | 50 | 20 | 50 |
| (3) | 50 | 30 | 50 |
| (4) | 50 | 40 | 50 |
| (5) | 50 | 50 | 50 |
| (6) | 50 | 100 | 50 |
| (7) | 50 | 150 | 50 |
| Example 61 | | | |
| (1) | 50 | 40 | 2 |
| (2) | 50 | 40 | 5 |
| (3) | 50 | 40 | 10 |
| (4) | 50 | 40 | 20 |
| (5) | 50 | 40 | 50 |
| (6) | 50 | 40 | 100 |
| (7) | 50 | 40 | 150 |
| Comp. Ex. 4 | — (0) | 40 | 50 |
| Comp. Ex. 5 | 50 | 40 | — (0) |
| Comp. Ex. 6 | 100 | — (0) | — (0) |
| Comp. Ex. 7 | — (0) | — (0) | — (0) |
| Comp. Ex. 8 | Alternate lamination of 5 layers each (Ti = 5 nm/Si = 5 nm) | | |

Residual magnetizations per unit area of the respective magnetic disks obtained in Examples 59 to 61 and Comparative Examples 4 to 8 were substantially constant, i.e. 1–1.1 memu/cm$^2$.

As is evident from the results shown in Table 11, film cracks were observed when the thickness of the first Ti layer was 10 nm in the magnetic disks of Comparative Examples 4, 7 and 8 and Example 59 and also the CSS durability was found poor. In Comparative Example 6 without the Si layer and Example 60 with the Si layer having a thickness of 10 nm, no film cracks were observed, but the CSS durability was found poorer than that when there were Si layers having a thickness of 20 nm or more. In Comparative Example 5 without the second Ti layer no film cracks were observed and the CSS durability was found satisfactory but the noise was higher. By providing the second Ti layer having a thickness of 2 nm or more, as in Example 61, the noise could be considerably lowered. That is, it can be seen that, among Examples 59, 60 and 61, the cases of the first Ti layer having a thickness of 20 nm, the Si layer having a thickness of 20 nm or more and the second Ti layer having a thickness of 2 nm or more could be free of film cracks and could have a satisfactory CSS durability and a lower noise.

Furthermore, among Examples 59, 60 and 61 free of film cracks and with a satisfactory CSS durability and a lower noise, the cases of the first Ti layer, Si layer and second Ti layer each having a thickness of more than 150 nm were large in both plane vibration and warpage and thus there is a failure of suspension stability of a magnetic head. Thus, it can be seen that the thickness each of the respective layers is desirably not more than 100 nm.

TABLE 11

| Example | Coercive force (Oe) | Square-ness ratio (Mr/Ms) | Noise ($\mu$Vrms) | SNR (dB) | Plane vibration ($\mu$m) | Warpage ($\mu$m) | Number of CSS (cycle) | Film cracks |
|---|---|---|---|---|---|---|---|---|
| 59 (1) | 2100 | 0.86 | 12.7 | 23.8 | 25 | 30 | 800 | Δ |
| (2) | 2150 | 0.84 | 12.5 | 23.9 | 26 | 32 | >5000 | ○ |
| (3) | 2180 | 0.85 | 12.4 | 24.0 | 28 | 33 | >5000 | ○ |
| (4) | 2200 | 0.85 | 12.0 | 24.2 | 24 | 31 | >5000 | ○ |
| (5) | 2300 | 0.86 | 11.5 | 24.6 | 30 | 40 | >5000 | ○ |
| (6) | 2400 | 0.85 | 11.5 | 24.6 | 42 | 50 | >5000 | ○ |
| 60 (1) | 2200 | 0.84 | 12.3 | 24.0 | 21 | 22 | 3000 | ○ |
| (2) | 2200 | 0.85 | 12.5 | 23.9 | 25 | 29 | >5000 | ○ |
| (3) | 2210 | 0.85 | 12.3 | 24.0 | 23 | 29 | >5000 | ○ |
| (4) | 2210 | 0.84 | 12.0 | 24.2 | 24 | 30 | >5000 | ○ |
| (5) | 2230 | 0.86 | 12.2 | 24.1 | 23 | 28 | >5000 | ○ |
| (6) | 2250 | 0.86 | 12.3 | 24.0 | 31 | 33 | >5000 | ○ |
| (7) | 2240 | 0.87 | 12.3 | 24.0 | 44 | 52 | >5000 | ○ |
| 61 (1) | 2100 | 0.82 | 13.6 | 23.2 | 22 | 26 | >5000 | ○ |
| (2) | 2150 | 0.82 | 13.0 | 23.5 | 21 | 24 | >5000 | ○ |
| (3) | 2150 | 0.84 | 12.5 | 23.9 | 23 | 28 | >5000 | ○ |
| (4) | 2150 | 0.84 | 12.4 | 24.0 | 24 | 30 | >5000 | ○ |
| (5) | 2200 | 0.85 | 12.0 | 24.2 | 24 | 29 | >5000 | ○ |
| (6) | 2500 | 0.85 | 11.5 | 24.6 | 30 | 35 | >5000 | ○ |
| (7) | 2600 | 0.86 | 11.0 | 25.0 | 45 | 49 | >5000 | ○ |
| Comp. Ex. 4 | 2250 | 0.84 | 12.6 | 23.8 | 24 | 28 | 1000 | Δ |
| Comp. Ex. 5 | 2300 | 0.87 | 18.0 | 20.7 | 25 | 29 | >5000 | ○ |
| Comp. Ex. 6 | 2400 | 0.87 | 11.2 | 24.8 | 26 | 29 | 2500 | ○ |
| Comp. Ex. 7 | 1980 | 0.82 | 13.0 | 23.5 | 21 | 26 | 500 | x |
| Comp. Ex. 8 | 2100 | 0.85 | 16.2 | 21.6 | 22 | 26 | 2500 | Δ |

EXAMPLE 62

Magnetic disks were prepared on the same substrates under the same conditions as in Example 59, except that Ta, Mo, V, Zr and Nb were used for materials for forming the layers (i) and (iii) and the thickness each of the layers (i) and (iii) was made 50 nm and that of Si layer as layer (ii) was fixed to 40 nm.

The respective magnetic disks obtained in Example 62 were determined for the magnetic characteristics, electro-magnetic conversion characteristics (SNR and noise), mechanical characteristics and CSS durability in the same manner as above. The results are summarized in the following Table 12.

TABLE 12

| Materials for layers (i) and (iii) | Coercive force (Oe) | Square-ness ratio (Mr/Ms) | Noise ($\mu$Vrms) | SNR (dB) | Plane vibration ($\mu$m) | Warpage ($\mu$m) | Number of CSS (cycle) | Film cracks |
|---|---|---|---|---|---|---|---|---|
| Ta | 2000 | 0.86 | 12.7 | 23.8 | 24 | 30 | >5000 | ○ |
| Mo | 2150 | 0.87 | 12.2 | 24.1 | 26 | 32 | >5000 | ○ |
| V  | 2050 | 0.85 | 12.4 | 24.0 | 25 | 34 | >5000 | ○ |
| Zr | 2100 | 0.87 | 11.0 | 25.0 | 24 | 31 | >5000 | ○ |
| Nb | 2150 | 0.86 | 11.5 | 24.6 | 27 | 33 | >5000 | ○ |

In the respective magnetic disks obtained in Example 62 residual magnetizations per unit area (Mr×t) were substantially constant, i.e. 1–1.1 memu/cm². As is evident from the results shown in Table 12, magnetic disks using Ta, Mo, V, Zr and Nb as materials for forming layers (i) and (iii) had no observable film cracks at all, and also had a satisfactory CSS durability. The magnetostatic characteristic was at the same level or a little lower than the coercive force in case of Ti (Example 59). Electromagnetic conversion characteristics were at the same level as those of the case of Ti in Example 59. Thus, it can be seen that even Ta, Mo, V, Zr and Nb can be used as materials for forming layers (i) and (iii) as effectively as Ti.

EXAMPLE 63 and 64

Magnetic disks were prepared on the same substrates under the same conditions as in Example 59, except that Ti was used as a material for forming the layers (i) and (iii), SiNCO (Example 5) and AlNCO (Example 6) were used as materials for forming the layer (ii), the thickness each of the layers (i) and (iii) was fixed to 50 nm, and the thickness of the layer (ii) was changed in a range of 10–150 nm. The SiNCO layer or the AlNCO layer were formed from a silicon target or an aluminum target by sputtering with an appropriately mixed gas of Ar, $N_2$, $O_2$ and $CH_4$ in a desired mixing ratio through a mass flow controller to control the composition of N, C and O of the SiNCO layer or the AlNCO layer. The respective compositions of the SiNCO layer and the AlNCO layer were obtained by preparing only a SiNCO film and an AlNCO film in advance, and analyzing their compositions by XPS (X-ray photoelectron spectroscopy) to determine the necessary mixing ratio of mixed gases for making $Si_{50}N_{35}C_5O_{10}$ and $Al_{50}N_{30}C_{10}O_{10}$, respectively. Even if the SiNCO film and the AlNCO film are the same compositions, respectively, the stress of films changes depending on sputtering conditions. Thus, the input power, mixing gas ratio and pressure were adjusted so as to make the stress of films zero. Since it is evident from the results shown in the foregoing Tables 5 to 8 that the oxygen concentration is desirably not more than 50 at. % from the viewpoint of corrosion resistance, the mixing ratio of mixed gas was set so that its oxygen concentration can be 10 at. %.

Magnetostatic characteristic and electro-magnetic conversion characteristics of the respective magnetic disks obtained in Examples 63 and 64 were substantially the same as those of the magnetic disks of Example 60, i.e. residual magnetization per unit area (Mr×t)=1–1.1 memu/cm², coercive force Hc=2,200–2,300 Oe, squareness ratio S=0.82–0.87 and integrated noise level at recording of 75 kFCI signal=12.1–12.5$\mu$ Vrms and SNR=23.5–24.1 dB. Mechanical characteristics, CSS durability and degree of film cracks of the respective magnetic disks obtained in Examples 63 and 64 are summarized in the following Table 13.

TABLE 13

| | Material for layer (ii) | Thickness of layer (ii) (nm) | Plane vibration ($\mu$m) | Warpage ($\mu$m) | Number of CSS (cycle) | Film cracks |
|---|---|---|---|---|---|---|
| Example 63 | SiNCO | 5   | 24 | 31 | 2500  | ○ |
|            |       | 10  | 26 | 32 | >5000 | ○ |
|            |       | 20  | 25 | 32 | >5000 | ○ |
|            |       | 30  | 24 | 30 | >5000 | ○ |
|            |       | 40  | 27 | 33 | >5000 | ○ |
|            |       | 50  | 28 | 35 | >5000 | ○ |
|            |       | 60  | 30 | 38 | >5000 | ○ |
|            |       | 80  | 42 | 50 | >5000 | ○ |
|            |       | 100 | 45 | 58 | >5000 | Δ |
|            |       | 120 | 52 | 65 | 3500  | x |
|            |       | 150 | 54 | 70 | 2100  | x |
| Example 64 | AlNCO | 5   | 24 | 32 | 2000  | ○ |
|            |       | 10  | 25 | 32 | >5000 | ○ |
|            |       | 20  | 24 | 35 | >5000 | ○ |
|            |       | 30  | 26 | 34 | >5000 | ○ |
|            |       | 40  | 27 | 33 | >5000 | ○ |
|            |       | 50  | 25 | 36 | >5000 | ○ |
|            |       | 60  | 29 | 37 | >5000 | ○ |
|            |       | 80  | 42 | 58 | >5000 | ○ |
|            |       | 100 | 48 | 65 | 4200  | Δ |
|            |       | 120 | 53 | 68 | 3000  | Δ |
|            |       | 150 | 55 | 72 | 1900  | x |

As is evident from the results shown in Table 13, the plane vibration and warpage are drastically increased and mechanical characteristics are deteriorated when the thicknesses of SiNCO layer and AlNCO layer exceed 60 nm. Film cracks also start to develop. This is due to extension of plasma and easy increase of substrate temperature due to reactive sputtering, an increased disk-susceptible heat quantity caused by a prolonged sputtering time to make the film thickness larger and consequent heat degradation of resin substrates and deformation. Thus, the thicknesses of SiNCO layer and AlNCO layer are desirably in a range of 20 nm to 60 nm.

As explained above, according to the present invention, distinguished SNR and mechanical characteristics can be obtained by forming on a resin substrate (A) at least one layer selected from Si, SiNCO and AlNCO and (B) at least one layer from silicides, nitrides, oxides, carbides or their mixtures of Ti, Ta, Mo, V, Zr and their alloys thereon, or by forming on a resin substrate (i) a layer comprised of at least one material selected from the group consisting of Ti, Ta, Mo, V, Zr, Nb and their alloys, (ii) at least one layer selected from the group consisting of an Si layer, an $Si_wN_xC_yO_z$ layer (where w+x+y+z=100 at. %, w≧30 at. %, 0≦z≦50 at. % and x+y≧20 at. %), and an $Al_wN_xC_yO_z$ layer (where w+x+y+z=100 at. %, w≧30 at. %, 0≦z≦50 at. % and x+y≧20 at. %) and (iii) a layer composed of at least one material selected from the group consisting of Ti, Ta, Mo, V, Zr and their alloys, and then by forming an underlayer, a magnetic layer and a protective layer successively thereon.

What is claimed is:

1. A magnetic recording medium, which comprises an underlayer, a ferromagnetic thin film metallic layer and a protective film layer successively and continuously laminated on a non-magnetic resin substrate, where (A) at least one layer selected from the group consisting of an Si layer, an $Si_wN_xC_yO_z$ layer (where w+x+y+z=100 at. %, w≧30 at. %, 0≦z≦50 at. % and x+y≧20 at. %), and an $Al_wN_xC_yO_z$ layer (where w+x+y+z=100 at. %, w≧30 at. %, 0≦z≦50 at. % and x+y≧20 at. %), and (B) at least one layer selected from the group consisting of silicides, nitrides, oxides, carbides or their mixtures of Ti, Ta, Mo, V, Zr and their alloys are laminated on the non-magnetic resin substrate and in the order of (A) and (B) between the non-magnetic resin substrate and the underlayer.

2. The magnetic recording medium according to claim 1, wherein the layer (A) has a film thickness of about 10 nm to 100 nm.

3. The magnetic recording medium according to claim 1, wherein the layer (B) has a film thickness of about 1.5 nm to 50 nm.

4. The magnetic recording medium according to claim 3, wherein the layer (B) has a film thickness of about 1.5 nm to 20 nm.

5. A magnetic recording medium, which comprises an underlayer, a ferromagnetic thin film metallic layer and a protective film layer successively and continuously laminated on a non-magnetic resin substrate, where (i) a layer composed of at least one material selected from the group consisting of Ti, Ta, Mo, V, Zr, Nb and their alloys, (ii) at least one layer selected from the group consisting of an Si layer, an $Si_wN_xC_yO_z$ layer (where w+x+y+z=100 at. %, w≧30 at. %, 0≦z≦50 at. % and x+y≧20 at. %) and an $Al_wN_xC_yO_z$ layer (where w+x+y+z=100 at. %, w≧30 at. %, 0≦z≦50 at. % and x+y≧20 at. %), and (iii) a layer composed of at least one material selected from the group consisting of Ti, Ta, Mo, V, Zr and their alloys are laminated on the non-magnetic resin substrate in the order of (i), (ii) and (iii) between the non-magnetic resin substrate and the underlayer.

6. The magnetic recording medium according to claim 5, wherein the layer (i) has a film thickness of about 20 nm to 100 nm.

7. The magnetic recording medium according to claim 5, wherein the layer (ii) has a film thickness of about 20 nm to 100 nm.

8. The magnetic recording medium according to claim 5, wherein the layer (iii) has a film thickness of about 2 nm to 100 nm.

9. The magnetic recording medium according to claim 5, wherein the layer (ii), when composed of SiNCO or AlNCO, has a film thickness of about 20 nm to 60 nm.

10. The magnetic recording medium according to claim 1, wherein the ferromagnetic thin film metallic layer comprises a Co alloy selected from the group consisting of CoCr, CoPt, CoCrNi, CoCrPt, CoCrNiPt, CoCrPtTa, CoCrPtW, CoCrPtMo, CoCrPtNb, CoCrPtTi, CoNiPt, CoNiPtTa, CoNiPtW, CoNiPtMo, CoNiPtNb, CoNiPtTi, CoCrTa, CoNiCrPtTa, CoNiCrPtW, CoNiCrPtMo, CoNiCrPtNb, and CoNiCrPtNi.

11. The magnetic recording medium according to claim 1, wherein the underlayer comprises:

Cr or Cr alloys; and

Mo or Mo Alloys.

12. The magnetic recording medium according to claim 11, wherein the Cr alloys contain at least one selected from the group consisting of Ti, Ta, Mo, W, Nb, V, Si, Al and Ni.

13. The magnetic recording medium according to claim 11, wherein the Mo alloys contain at least one selected from the group consisting of Ti, Ta, Mo, W, Nb, V, Si, Al and Ni.

14. The magnetic recording medium according to claim 1, wherein the non-magnetic resin substrate comprise at least one resin selected from the group consisting of polycarbonate, polystyrene, polymethyl methacrylate, polyolefin, epoxy resins, polyvinyl esters, ultraviolet curable resins, polyethylene terephthalate, polyethylene naphthalate, polyimide, polyamide, polyimide-amide and polyether imide.

15. The magnetic recording medium according to claim 14, wherein the resin is mixed with a filler selected from the group consisting of alumina, Cr oxide and carbon.

16. The magnetic recording medium according to claim 5, wherein the ferromagnetic thin film metallic layer comprises a Co alloy selected from the group consisting of CoCr, CoPt, CoCrNi, CoCrPt, CoCrNiPt, CoCrPtTa, CoCrPtW, CoCrPtMo, CoCrPtNb, CoCrPtTi, CoNiPt, CoNiPtTa, CoNiPtW, CoNiPtMo, CoNiPtNb, CoNiPtTi, CoCrTa, CoNiCrPtTa, CoNiCrPtW, CoNiCrPtMo, CoNiCrPtNb, and CoNiCrPtNi.

17. The magnetic recording medium according to claim 5, wherein the underlayer comprises:

Cr or Cr alloys; and

Mo or Mo Alloys.

18. The magnetic recording medium according to claim 17, wherein the Cr alloys contain at least one selected from the group consisting of Ti, Ta, Mo, W, Nb, V, Si, Al and Ni.

19. The magnetic recording medium according to claim 17, wherein the Mo alloys contain at least one selected from the group consisting of Ti, Ta, Mo, W, Nb, V, Si, Al and Ni.

20. The magnetic recording medium according to claim 5, wherein the non-magnetic resin substrate comprise at least one resin selected from the group consisting of polycarbonate, polystyrene, polymethyl methacrylate, polyolefin, epoxy resins, polyvinyl esters, ultraviolet curable resins, polyethylene terephthalate, polyethylene naphthalate, polyimide, polyamide, polyimide-amide and polyether imide.

21. The magnetic recording medium according to claim 20, wherein the resin is mixed with a filler selected from the group consisting of alumina, Cr oxide and carbon.

* * * * *